(12) United States Patent
Shives et al.

(10) Patent No.: US 8,291,577 B2
(45) Date of Patent: Oct. 23, 2012

(54) APPARATUS FOR LOADING STATOR WINDINGS INTO A STATOR CORE

(75) Inventors: Jeremiah Shives, Nobleville, IN (US); Kirk Neet, Pendleton, IN (US); David Schuster, Indianapolis, IN (US); Keith J. Murphy, Simsbury, CT (US)

(73) Assignee: Remy Technologies L.L.C., Pendleton, IN (US)

( * ) Notice: Subject to any disclaimer, the term of this patent is extended or adjusted under 35 U.S.C. 154(b) by 0 days.

(21) Appl. No.: 13/198,949

(22) Filed: Aug. 5, 2011

(65) Prior Publication Data
US 2011/0283529 A1 Nov. 24, 2011

Related U.S. Application Data

(62) Division of application No. 12/621,174, filed on Nov. 18, 2009, now Pat. No. 8,096,046.

(51) Int. Cl.
*B23P 19/00* (2006.01)
(52) U.S. Cl. .............. 29/732; 29/596; 29/736; 140/92.2
(58) Field of Classification Search ............ 29/732–736, 29/596–598; 140/92.2, 124
See application file for complete search history.

(56) References Cited

U.S. PATENT DOCUMENTS

| | | | |
|---|---|---|---|
| 4,477,966 A * | 10/1984 | Napierski | 29/596 |
| 4,512,376 A * | 4/1985 | Barrera | 140/92.1 |
| 4,723,354 A * | 2/1988 | Moser | 29/596 |
| 5,485,670 A * | 1/1996 | Bouman et al. | 29/732 |
| 5,657,530 A | 8/1997 | Kawamura et al. | |
| 6,640,421 B2 * | 11/2003 | Katsuzawa et al. | 29/732 |
| 6,750,582 B1 | 6/2004 | Neet | |
| 6,858,963 B2 | 2/2005 | Neet | |
| 6,882,077 B2 | 4/2005 | Neet | |
| 6,885,124 B2 | 4/2005 | Neet | |
| 6,930,426 B2 | 8/2005 | Neet et al. | |
| 6,940,202 B1 | 9/2005 | Chen et al. | |
| 6,949,857 B2 | 9/2005 | Neet et al. | |
| 7,129,612 B2 | 10/2006 | Neet | |
| 7,143,501 B2 | 12/2006 | Bramson et al. | |

(Continued)

FOREIGN PATENT DOCUMENTS
JP 2002176752 A 6/2002
(Continued)

OTHER PUBLICATIONS

International Search Report and Written Opinion for corresponding Application No. PCT/US2010/057209, dated Jul. 19, 2011, pp. 1-9.

(Continued)

*Primary Examiner* — Minh Trinh
(74) *Attorney, Agent, or Firm* — Cantor Colburn LLP

(57) ABSTRACT

An apparatus for loading stator windings into a stator core includes an arbor member including a body having an outer diametric portion and a central axis. The outer diametric potion includes a plurality of slots. The apparatus also includes a guide track having a first end that extends to a second end through a slide portion. The first end is positioned adjacent the outer diametric portion of the arbor member. At least one of the guide track and the arbor member is selectively positionable to guide slot segment portions of a stator winding into predetermined ones of the plurality of slots.

9 Claims, 7 Drawing Sheets

U.S. PATENT DOCUMENTS

| | | |
|---|---|---|
| 7,170,211 B2 | 1/2007 | Chen et al. |
| 7,269,888 B2 | 9/2007 | Neet |
| 7,365,467 B2 | 4/2008 | Bramson et al. |
| 7,386,931 B2 | 6/2008 | Neet et al. |
| 7,779,536 B2 | 8/2010 | Stratico et al. |
| 8,096,046 B2 * | 1/2012 | Shives et al. ............... 29/732 |
| 2005/0062359 A1 | 3/2005 | Neet et al. |
| 2005/0133655 A1 | 6/2005 | Hashimoto et al. |
| 2006/0226727 A1 | 10/2006 | Bramson et al. |
| 2010/0139082 A1 | 6/2010 | Shives et al. |
| 2010/0231082 A1 | 9/2010 | Bodin et al. |

FOREIGN PATENT DOCUMENTS

| | | |
|---|---|---|
| JP | 2009524389 A | 6/2009 |

OTHER PUBLICATIONS

International Preliminary Report on Patentability for PCT Application No. PCT/US2010/057209, dated May 31, 2012, pp. 1-6.

* cited by examiner

APPARATUS FOR LOADING STATOR WINDINGS INTO A STATOR CORE

CROSS REFERENCE TO RELATED APPLICATION

This is a divisional application related to U.S. application Ser. No. 12/621,174 filed Nov. 18, 2009 U.S. Pat. No. 8,096,046 dated Jan. 17, 2012 entitled, "METHOD AND APPARATUS FOR LOADING STATOR WINDINGS INTO A STATOR CORE".

BACKGROUND OF THE INVENTION

Exemplary embodiments pertain to the art of electrical machines and, more particularly, to an apparatus for loading stator windings into a stator core of an electrical machine.

Many electrical machines, such as alternating current electric generators, include a stator assembly and a rotor assembly arranged in a housing. The stator assembly is mounted to the housing and includes a generally cylindrical stator core provided with a plurality of slots. Conductors or stator windings are fitted into the plurality of slots in a predetermined pattern. The stator windings are forms of slot segments that are located in select ones of the plurality of slots to form a multi-phase winding pattern and end loop segments that connect between adjacent slot segments. The rotor assembly includes a rotor attached to a shaft that is rotatably mounted to the housing coaxially with the stator core. The rotor is rotated within the stator core to develop an electrical current.

Inserting the stator windings into the plurality of slots is a complex task. In some arrangements, a winding needle lays a wire into one of the plurality of slots, advances and lays the wire into another of the plurality of slots. This process continues until the stator core is wound and each of the plurality of slots is filled. At this point, the wire is cut to form the multiple phases. In other arrangements, a wire is preformed with slot segments interconnected by end loops. The slot segments are spaced so as to be inserted into select ones of the plurality of slots in a predetermined pattern. The wire is then loaded directly into the stator core with the slot segments being inserted into the select ones of the plurality of slots. Once the wire is loaded into the stator core, another wire is prepared and loaded in a similar manner. This process continues, each wire being inserted individually into the stator core, until the multi-phase pattern is complete. In still other arrangements, the wire is formed, transferred to a receiver having a plurality of slots, and loaded into corresponding slots provided in a transfer tool. With this arrangement, each wire that makes up one of the multiple-phases is formed, individually transferred to the slots in the receiver, and individually transferred from the slots in the receiver to the slots in the transfer tool. At this point, the transfer tool is inserted into the stator core and the wires are loaded into the plurality of slots.

BRIEF DESCRIPTION OF THE INVENTION

Disclosed is an apparatus for loading stator windings into a stator core. The apparatus includes an arbor member including a body having an outer diametric portion and a central axis. The outer diametric potion includes a plurality of slots. The apparatus also includes a guide track having a first end that extends to a second end through a slide portion. The first end is positioned adjacent the outer diametric portion of the arbor member. At least one of the guide track and the arbor member is selectively positionable to guide slot segment portions of a stator winding into predetermined ones of the plurality of slots.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
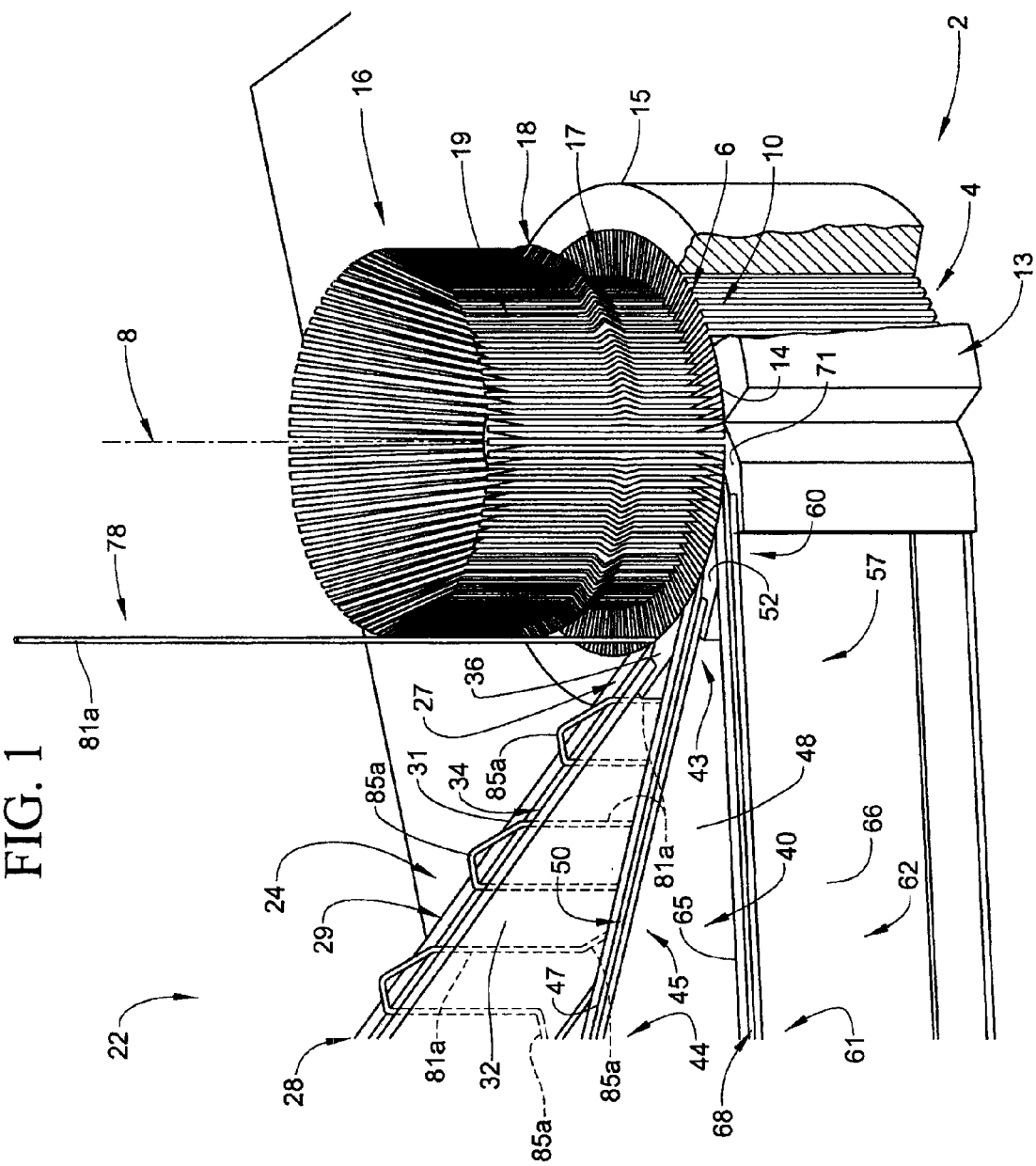
FIG. 1 is an upper perspective view of an apparatus for inserting stator windings into a stator core in accordance with an exemplary embodiment depicting a first stator winding being loaded.
Figure 2:
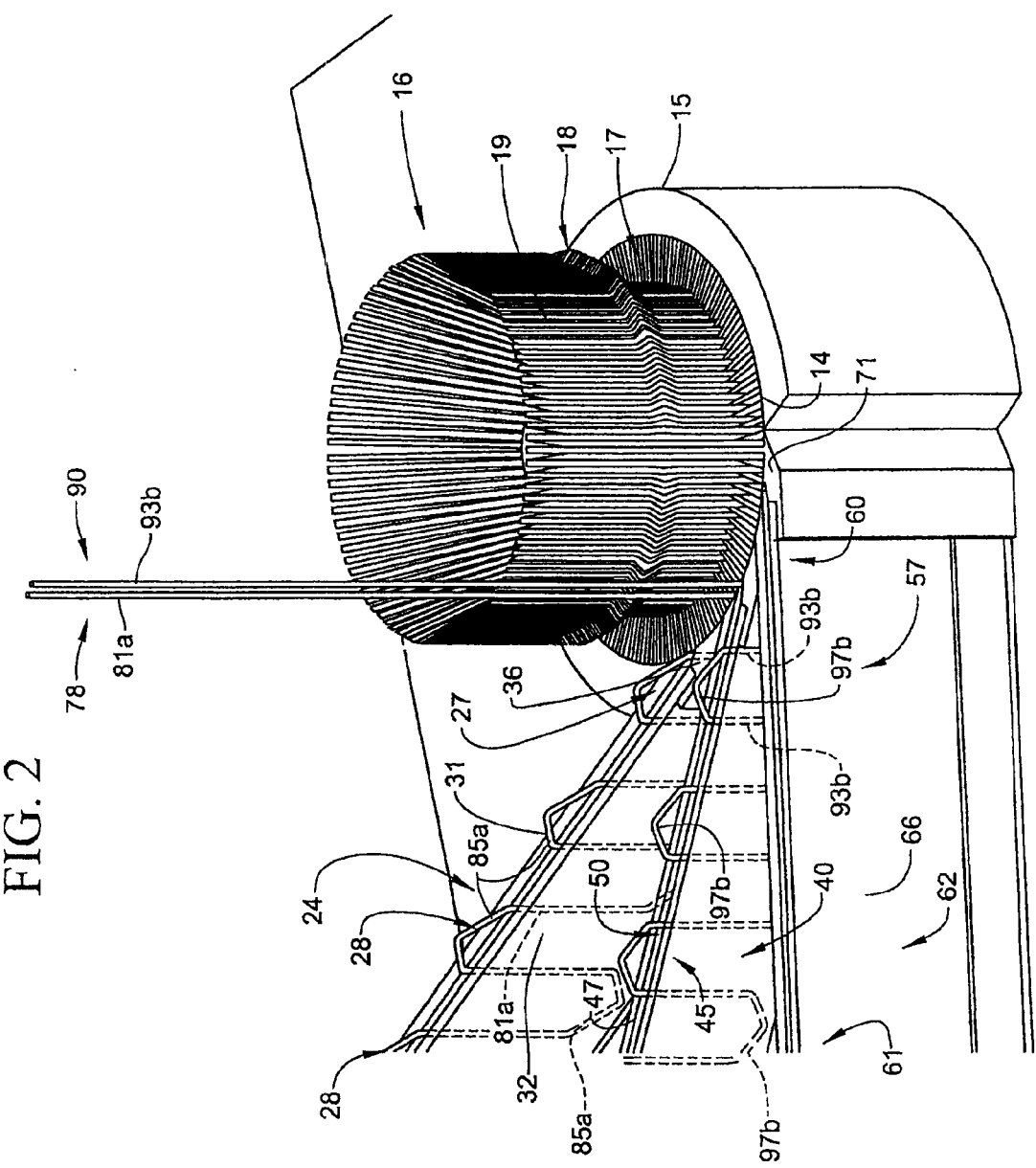
FIG. 2 is an upper perspective view of an apparatus for inserting stator windings into a stator core in accordance with an exemplary embodiment depicting a second stator winding being loaded.
Figure 3:
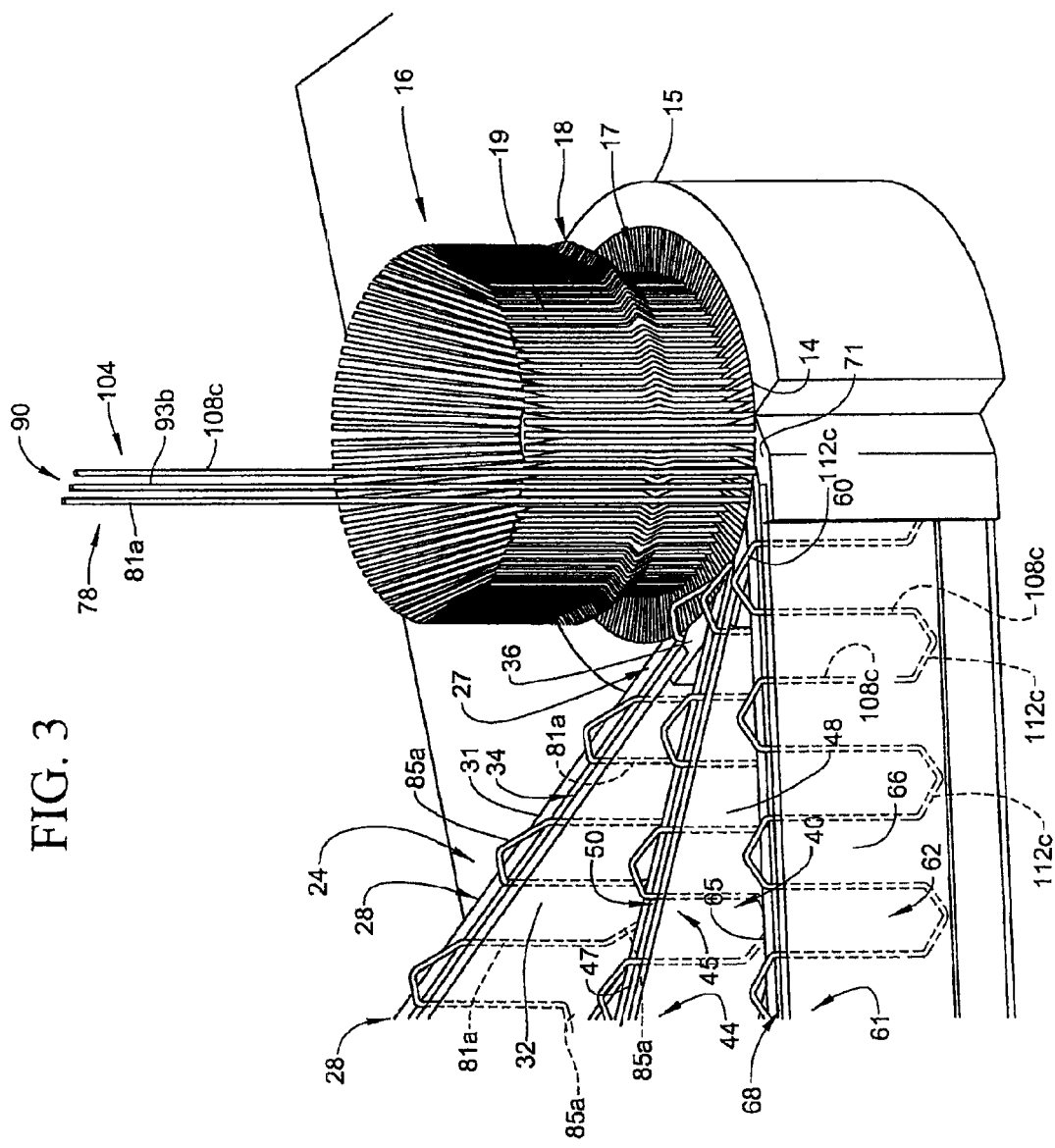
FIG. 3 is an upper perspective view of an apparatus for inserting stator windings into a stator core in accordance with an exemplary embodiment depicting a third stator winding being loaded.

Referencing FIGS. 1-3, an apparatus for readily inserting multiple start wires into a stator core is indicated generally at 2. Apparatus 2 includes an arbor member 4 having an outer diametric portion 6 and a central axis 8. Arbor member 4 includes a plurality of slots 10 that are arranged on outer diametric portion 6. In the exemplary embodiment shown, arbor member 4 is positioned within a holding fixture 13 having an inner diametric wall 14 and an outer diametric wall 15. Arbor member 4 is further shown to include a plurality of loading fingers 16 each of which includes a defined first or loading portion 17, a second or pushing portion 18, and a third or final positioning portion 19. As will become more fully evident, apparatus 2 further includes a plurality of guide tracks 22 that transport and position stator wire in a predetermined configuration within the plurality of slots 10.

As further shown in the exemplary embodiment, apparatus 2 includes a first guide track 24 including a first end 27 that extends to a second end 28 through a slide portion 29. First guide track 24 includes a first guide track member 31 that is spaced from a second guide track member 32 so as to define a first unobstructed guide path 34. A guide member 36 is positioned at first end 27 of first guide track 24. As will be discussed more fully below, guide member 36 assists in positioning stator wire within select ones of the plurality of slots 10. Apparatus 2 also includes a second guide track 40 having a first end 43 that extends to a second end 44 through a slide portion 45. In a manner similar to that described above, second guide track 40 includes a first guide track member 47 that is spaced from a second guide track member 48 so as to define a second unobstructed guide path 50. Second guide track 40 also includes a guide member 52 positioned at first end 43. Apparatus 2 is also shown to include a third guide track 57 having a first end 60 that extends to a second end 61 through a slide portion 62. In a manner also similar to that described above, third guide track 57 includes a first guide track member 65 that is in a spaced relationship relative to a second guide track member 66 so as to define a third unobstructed guide path 68. Third guide track 57 also includes a guide member 71 positioned at first end 60. At this point, it should be understood that while although shown with three guide tracks, the number of guide tracks employed in connection with apparatus 2 could vary. Notably, in one embodiment, the number of guide tracks employed in connection with apparatus 2 varies in relation to the number of wires required for a particular stator core. Generally, the number of required wires is a multiple of the number of phases required for a particular electric machine. Since most modern alternators include six phases, apparatus 2, in accordance with an exemplary embodiment, will typically include either 6 or 12 guide tracks.

In order to load a stator core, a first stator winding 78 is passed along slide portion 29 of first guide track 24. As best shown in FIG. 1, first stator winding 78 includes a plurality of slot segments 81a and a plurality of end loop segments 85a. First stator winding 78 slides along first unobstructed guide path 34 such that a first one of the plurality of slot segments 81a is positioned within a particular one of the plurality of slots 10. Similarly, a second stator winding 90 is passed along second unobstructed guide path 50 of second guide track 40. As shown in FIG. 2, second stator winding 90 includes a plurality of slot segments 93b as well as a plurality of end loop segments 97b. Second stator winding 90 slides along second unobstructed guide path 50 so as to position a first one of the plurality of slot segments 93b within another select one of the plurality of slots 10. In accordance with one exemplary aspect, the first one of the plurality of slot segments 81a and the first one of the plurality of slot segments 93b is positioned in specific slots 10 with respect to each other. That is, first one of the plurality of slot segments 81a and the first one of the plurality of slot segments 93b are located in two adjacent slots 10 as shown in FIG. 2. Therefore, to ensure that the first one of the plurality of slot segments 93b enters the appropriate one of the plurality of slots 10 relative to the first one of the plurality of slot segments 81a, arbor member 4 is indexed about central axis 8 after the insertion of the first one of the plurality of slot segments 81a, but prior to the insertion of the first one of the plurality of slot segments 93b. After second stator winding 90 is properly positioned, a third stator winding 104 moves along slide portion 62 towards yet another selected one of the plurality of slots 10. As shown in FIG. 3, third stator winding 104 includes a plurality of slot segments 108c and a plurality of end loop segments 112c. In a manner similar to that described above, in order to ensure that the first of the plurality of slot segments 108c is properly positioned, arbor member 4 is indexed around central axis 8 after the insertion of the first one of a plurality of slot segments 93b and before the insertion of the first one of a plurality of slot segments 108c.

Figure 4:
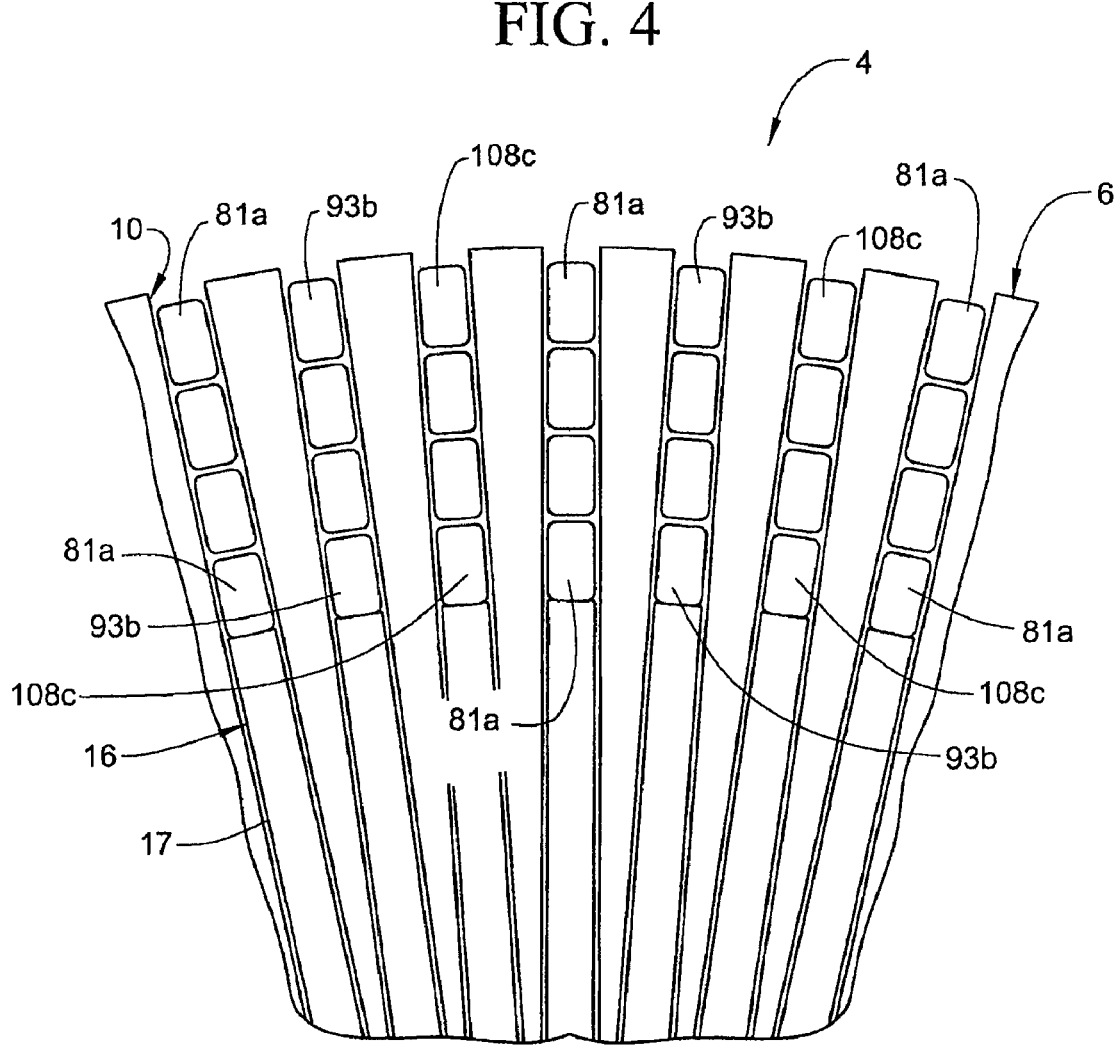
FIG. 4 is a partial plan view of the apparatus illustrating slot segment portions of three stator windings.

After positioning a first one of the plurality of slot segments 81a, 93b, and 108c within the plurality of slots 10, arbor member 4 is rotated about central axis 8 so as to load each stator winding 78, 90 and 104 such as shown in FIG. 4. In the exemplary embodiment shown, arbor member 4 is rotated to ensure that there exist four layers of stator wire within each of the plurality of slots 10. Once arbor member 4 is loaded, remaining portions, if any, of stator windings 78, 90 and 104 are detached. Of course, arbor member 4 could be loaded with any number of layers depending upon customer requirements.

Figure 5:
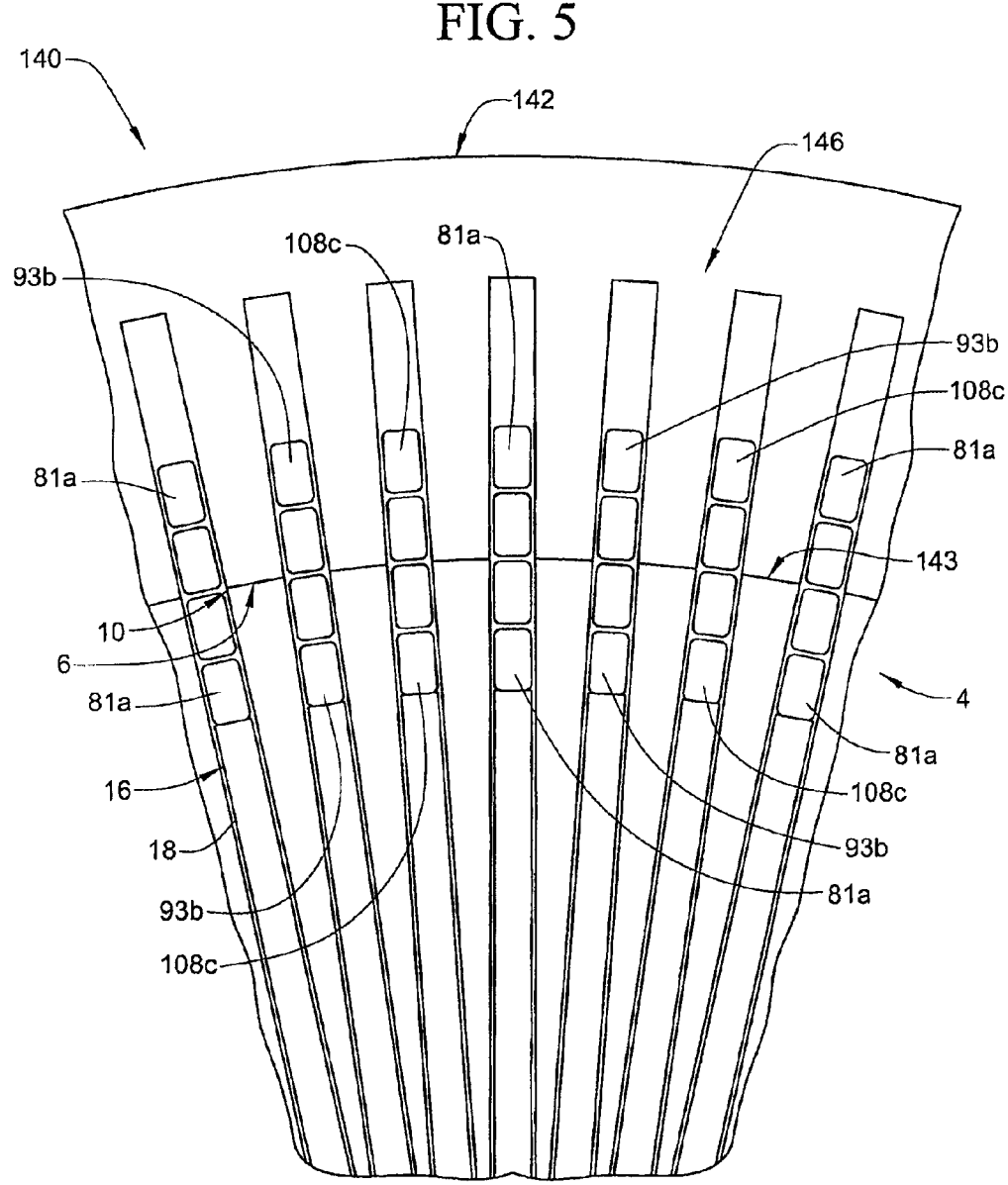
FIG. 5 is a partial plan view if the apparatus of FIG. 4 shown inserted into a stator core.
Figure 6:
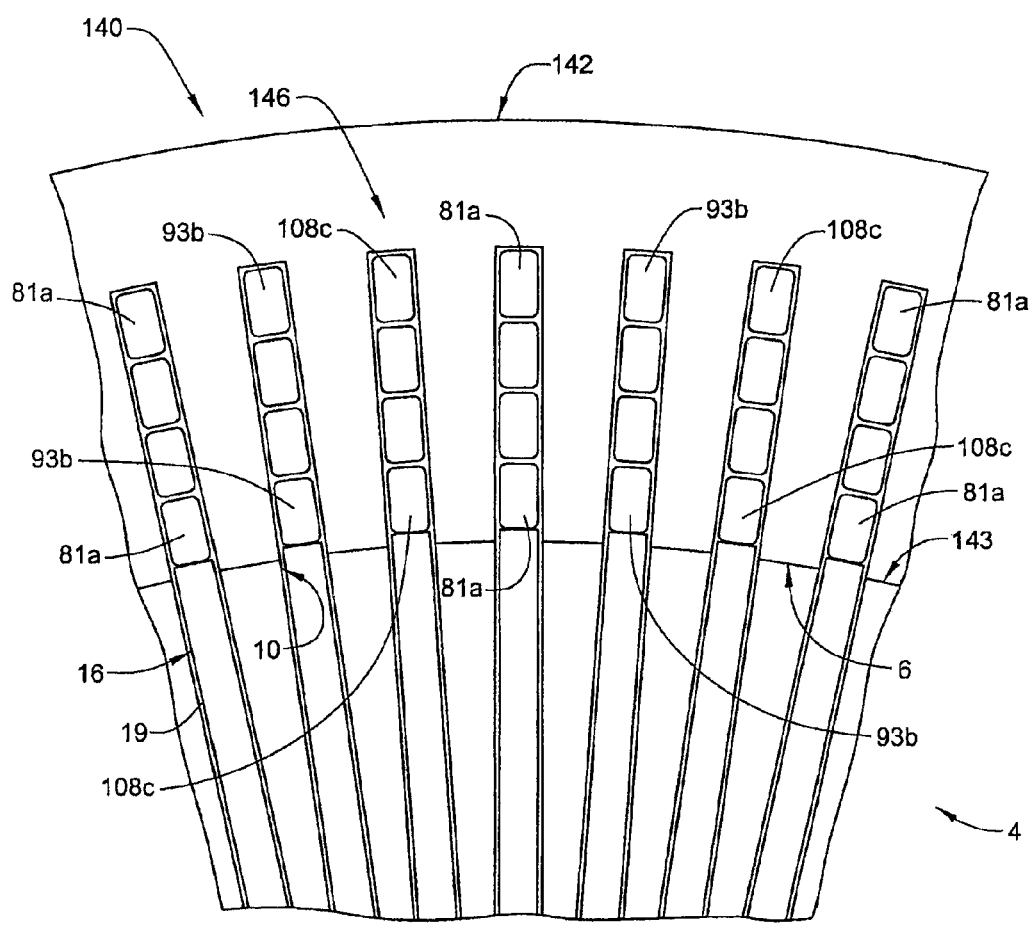
FIG. 6 is the apparatus of FIG. 5 shown transferring the slot segments of the three stator windings into the stator core.
Figure 7:
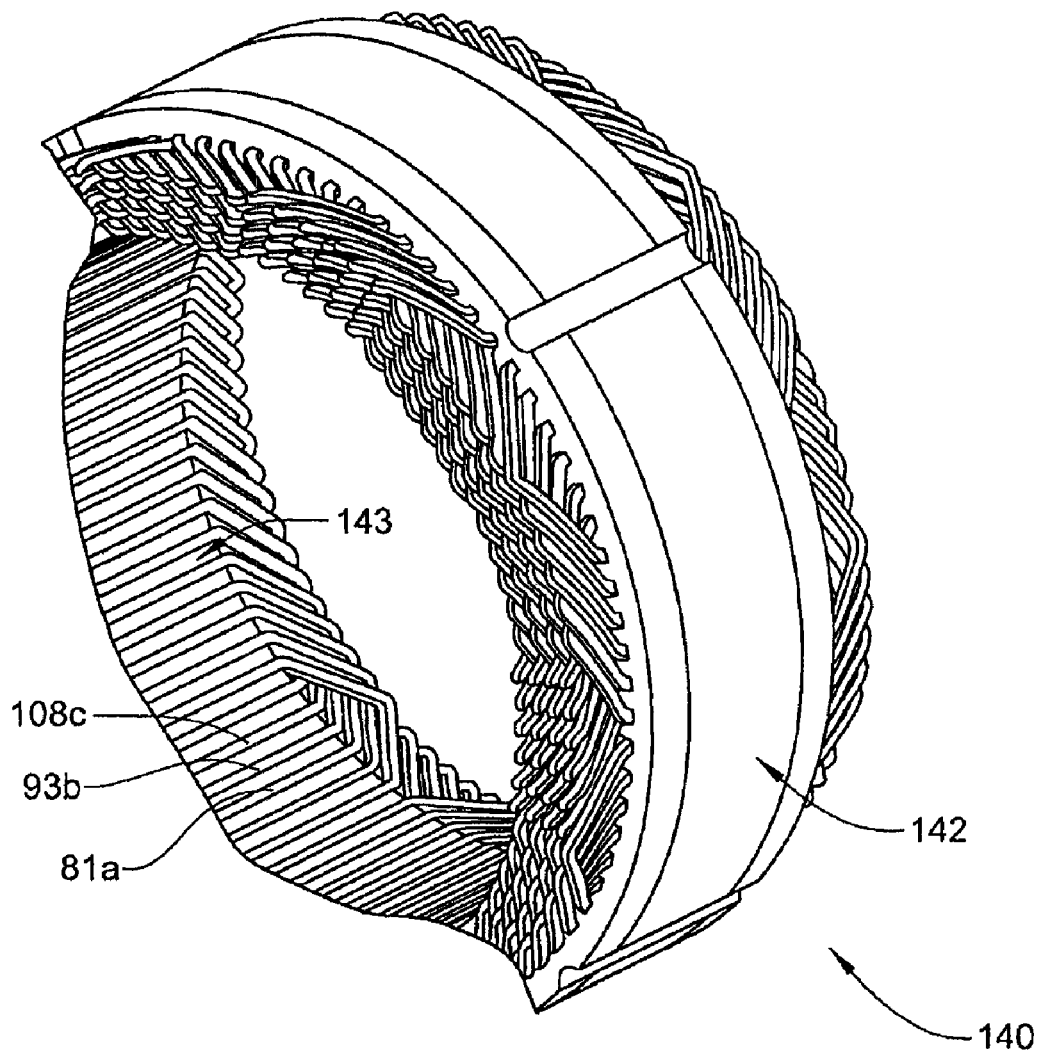
FIG. 7 is a partial perspective view of a stator core loaded with stator windings in accordance with the exemplary embodiment.

At this point, arbor member 4 is inserted into a stator core 140 such as shown in FIG. 5. In the exemplary embodiment shown, stator core 140 includes an outer diametric portion 142 and an inner diametric portion 143 that is slightly larger than outer diametric portion 6 of arbor member 4. Stator core 140 includes a plurality of slots 146 that extend from inner diametric portion 143 towards outer diametric portion 142. As shown, the plurality of slots 146 correspond to the plurality of slots 10 formed in arbor member 4. Towards that end, once arbor member 4 is properly positioned within stator core 140, loading fingers 16 are drawn radially outward from central axis 8 such that loading portion 17 transitions to pushing portion 18 which then engage the plurality of slot segments arranged within each of the plurality of slots 10. As loading fingers 16 travel radially outward from central axis 8, pushing portion 18 transitions to third portion 19 thereby urging the plurality of slot segments from the plurality of slots 10 in arbor member 4 and into the plurality of slots 146 within stator core 140. In this manner, arbor member 4 loads stator core 140 with wire forming a stator core assembly such as shown in FIG. 7. With this arrangement, exemplary embodiments provide a system for loading multiple stator wires into a stator core. The system requires minimal steps that simplify manufacturing and enhance production.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the claims.

What is claimed is:

1. An apparatus for loading stator windings into a stator core, the apparatus comprising:
    an arbor member including a body having an outer diametric portion and a central axis, the outer diametric potion including a plurality of slots;
    at least one guide track including a first end that extends to a second end through a slide portion, the first end being positioned adjacent the outer diametric portion of the arbor member, wherein at least one of the guide track and the arbor member is selectively positionable to guide slot segment portions of a stator winding into predetermined ones of the plurality of slots.

2. The apparatus according to claim 1, further comprising: a guide member mounted to the first end portion of the at least one guide track.

3. The apparatus according to claim 1, further comprising: a plurality of loading fingers extending through the body of the arbor member, each of the plurality of loading fingers being arranged in a respective one of the plurality of slots.

4. The apparatus according to claim 1, wherein the at least one guide track extends away from the arbor member at an acute angle.

5. The apparatus according to claim 1, further comprising: a stator winding including a plurality of slot segment portions arranged in the at least one guide track, the slide portion of the at least one guide track being configured and disposed to enable the stator winding to slide towards the arbor member.

6. The apparatus of claim 1, wherein the at least one guide track constitutes at least three guide tracks.

7. The apparatus according to claim 6, wherein each of the at least three guide tracks extends away from the arbor member at an angle.

8. The apparatus according to claim 7, wherein at the angle is an acute angle.

9. The apparatus according to claim 6, wherein each of the at least three guide tracks extends away from the arbor member at distinct angles.

* * * * *